Figure 1:
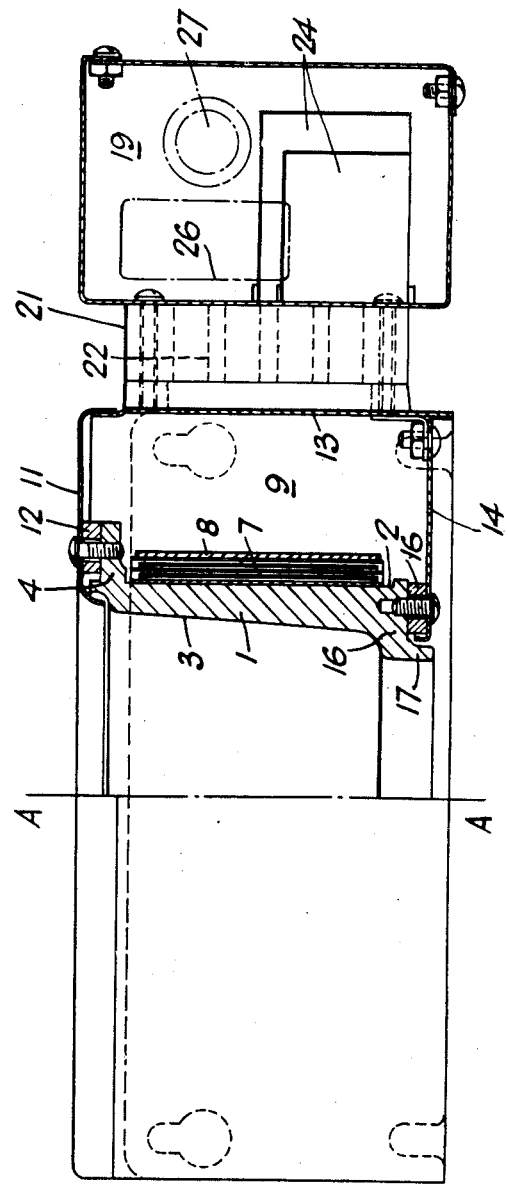

June 24, 1958  W. H. M. BUTCHER  2,840,683
HEATING APPARATUS
Filed Aug. 31, 1955  3 Sheets-Sheet 1

INVENTOR
WILLIAM HUBERT MAXWELL BUTCHER
BY
ATTORNEY

June 24, 1958 W. H. M. BUTCHER 2,840,683
HEATING APPARATUS
Filed Aug. 31, 1955 3 Sheets-Sheet 2

INVENTOR
WILLIAM HUBERT MAXWELL BUTCHER
BY
ATTORNEY

June 24, 1958 W. H. M. BUTCHER 2,840,683
HEATING APPARATUS
Filed Aug. 31, 1955 3 Sheets-Sheet 3

INVENTOR
WILLIAM HUBERT MAXWELL BUTCHER
BY
ATTORNEY

United States Patent Office 2,840,683
Patented June 24, 1958

2,840,683

HEATING APPARATUS

William Hubert Maxwell Butcher, Welling, England, assignor to The General Electric Company, Limited, London, England Application August 31, 1955, Serial No. 531,652

9 Claims. (Cl. 219—43)

This invention relates to electric heating apparatus and more particularly, but not exclusively, to electric heating apparatus for use in aircraft.

At the present time, hotcups are widely used aboard aircraft for heating small quantities of beverages, these hotcups consisting generally of an inner and an outer metal container having an electric heating element mounted therebetween and the hotcup being provided with a pair of contact pins for connection of the heating element to an electric supply socket mounted in the aircraft galley. However, these hotcups are relatively expensive and are very prone to damage due to mishandling, especially when being loaded and unloaded at air ports.

It is an object of the present invention to provide an electric heating apparatus which is not so liable to damage as the hotcups referred to above.

According to the present invention, an electric heating apparatus comprises a cup-shaped member formed of material of good heat conductivity, the member being adapted to receive and support a portable liquid container and the base of the member having one or more holes extending therethrough, and an electric heating element associated with the member and arranged to heat, by thermal conduction through the member, a liquid container received and supported by the member.

The cup-shaped member may be annular.

An electric heating element may be disposed around the side wall of the cup-shaped member, and the electric heating element may consist of an electric resistance wire wound on a flexible insulating support wrapped around the side wall of the member.

A casing may be provided around the cup-shaped member and arranged to shield the heating element from liquid falling on the apparatus.

Alternatively, the electric heating element may be disposed adjacent the base of the cup-shaped member, and a reflector may be positioned at the opposite side of the heating element to the cup-shaped member and arranged to reflect radiation from the heating element on to the base of the cup-shaped member.

The heating element may be a sheathed wire electric heating element.

The cup-shaped member may be formed with an outwardly depending flange around its lip, the flange being adapted to support a cooking utensil so that heat may be conducted through the cup-shaped member from the heating element to the cooking utensil.

A terminal box may be disposed one side of the cup-shaped member and connected to said member by at least one hollow arm of insulating material through which an electric conductor may pass to the heating element.

Two constructions of electric heating apparatus according to the present invention will now be described by way of example with reference to Figures 1 and 2 of the drawing accompanying the provisional specification and to the accompanying Figure 3.

Figure 2:
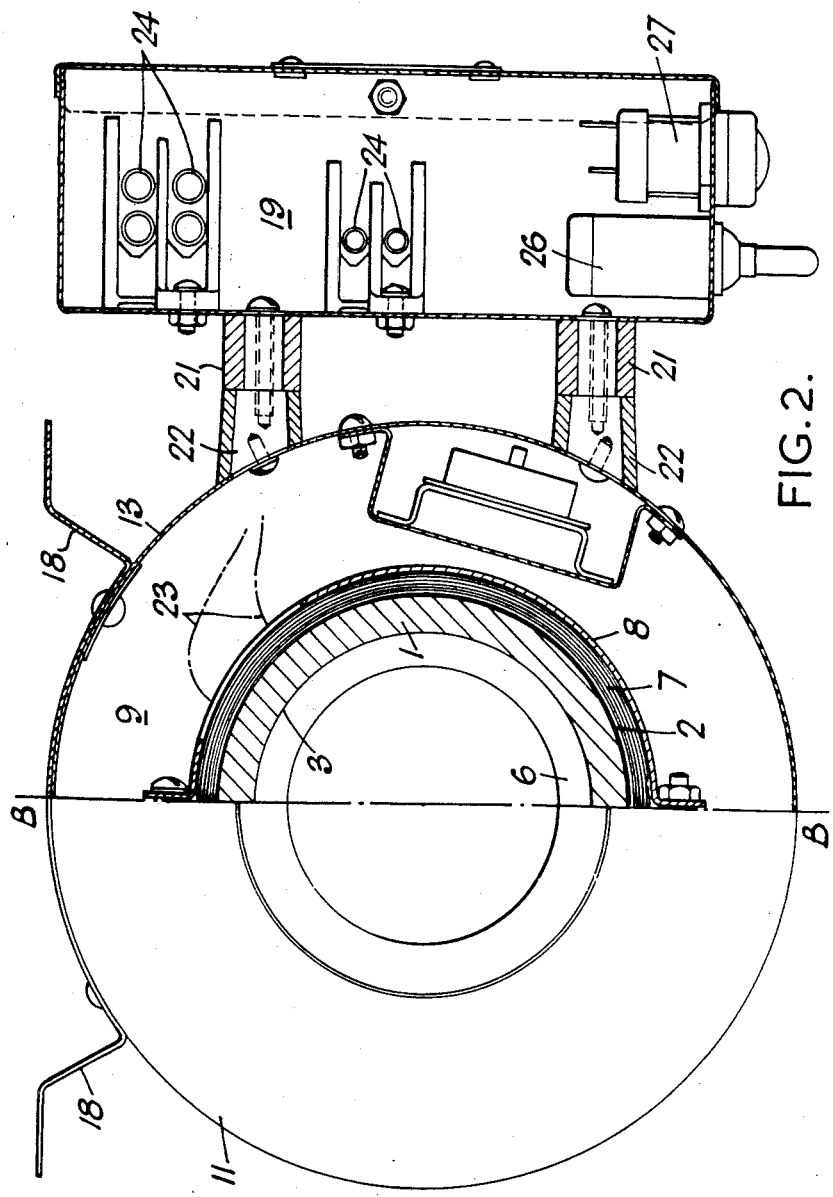
Figure 3:
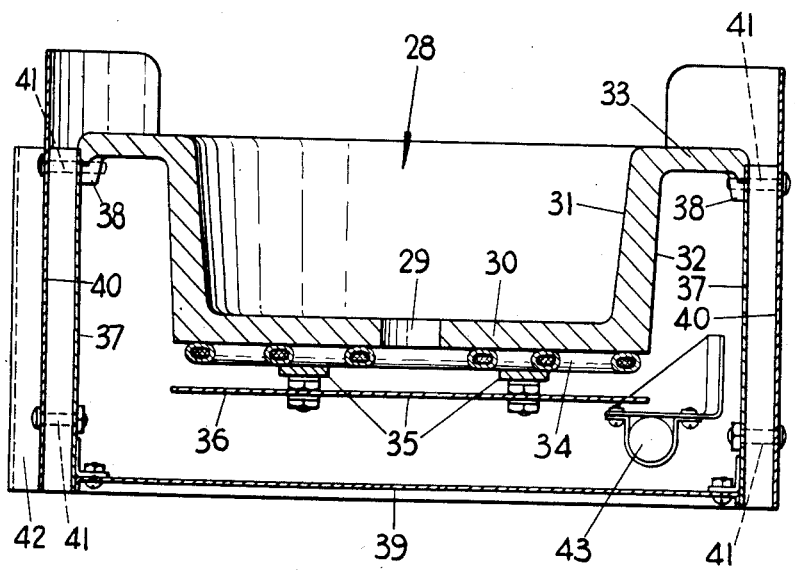

Figure 1 shows an elevation of the first construction, the parts to the right of the line A—A being shown in section, Figure 2 shows a plan view of this construction, the parts to the right of the line B—B being shown in section, and Figure 3 shows a sectional elevation of the second construction.

Both constructions of electric heating apparatus are intended for use in the galley of an aircraft to heat small quantities of beverage contained in a portable canister, flask, percolator or other suitable liquid container, and in addition the second construction is intended for the heating of a frying pan.

Referring now to Figures 1 and 2 of the drawings, the first construction of heating apparatus comprises an annular cup-shaped member 1 of cast aluminum adapted to receive and support a canister, flask or other suitable container (not shown).

The annular member 1 is formed with a cylindrical outer surface 2 generally coaxial with the axis of the member and with a part-conical inner surface 3, and an outwardly depending lip 4 and an inwardly extending lip 6 are formed respectively around the thinner and thicker rims of the member. The thinner rim with its outwardly depending lip 4 constitutes the upper end of the annular member 1, and the inwardly extending lip 6 constitutes the base of the cup-shaped member. The inner surface 3 is convergent towards the inner lip 6.

Disposed around the outer surface 2 of the annular member 1 is an electric heating element 7 comprising an electric resistance wire wound on a mica support which is wrapped around the annular member 1 and clamped against the outer surface 2 by a metal strap 8 encircling the element 7. The element 7 is shielded from falling liquid to a certain extent by the outwardly depending lip 4 of the annular member 1, and the protection is completed by a stainless steel casing 9, the upper face 11 of which overlaps the upper end of the annular member 1 and is screwed to the outwardly depending lip 4 although spaced therefrom by a number of insulating washers 12. The casing 9 is closed by a cylindrical side face 13 which extends coaxially of and outside the annular member 1 and by a lower face 14 parallel to the upper face 11 and perpendicular to the axis of the annular member 1. The lower face 14 of the casing 9 is screwed to the lower end of the annular member 1 although spaced therefrom by a number of insulating washers 16. A downward flange 17 on the inwardly extending lip 6 shields the inner edge of the lower face 14 of the casing 9 from any liquid which might run down the inner surface 3 of the annular member 1.

A mounting bracket 18 for the apparatus is rivetted to the side face 13 of the casing 9, and a terminal box 19 is supported away from the casing 9 by a pair of arms 21 of insulating material secured to the casing 9 and formed with internal slots 22 through which connecting wires 23 to the heating element 7 may extend to the terminal box 19. The terminal box 19 is provided with terminals 24 for the connection of an electric current supply and an electric switch 26 is mounted at one end of the box for control of the energisation of the heating element 7, an indicator lamp 27 being mounted adjacent to the switch and connected to indicate when the heating element 7 is energised.

The heating apparatus is adapted to heat a suitable canister or flask together with any liquid contained therein, the canister or flask being inserted in the space within the annular member 1 and being supported by the inwardly extending lip 6 at the lower end of this member or by the converging inner surface 3 of this member. A suitable canister is formed of aluminium and is of such shape and size that it just rests on the inwardly extending lip 6 when the wall of the canister is in good contact with the inner surface 3 of the annular member 1. When the element 7 is energised, therefore, heat is conducted through the annular member 1 to the canister and its contents.

If necessary, a thermostat may be mounted within the casing 9 to safeguard the heating element from overheating.

Further, an electric switch may be mounted near the lower end of the annular member 1 so that the switch may be automatically actuated to energise the heating element 7 when a filled or partially-filled canister is positioned in the annular member 1.

It will be appreciated that other forms of electric heating element than that described may be used. Thus a sheathed wire element may be used, and it may be cast in position in the annular member 1.

A sheathed wire heating element may be disposed around the annular member 1 or, as shown in the second construction, positioned adjacent the base of the annular member 1.

Referring now to Figure 3 of the drawings, the second construction of heating apparatus comprises a substantially annular cup-shaped member 28 of cast aluminium having an axial hole 29 in its base 30. The side wall of the member 28 has a part-conical inner surface 31 convergent towards the base 30 of the member, and a slightly less convergent outer surface 32, and an outwardly depending flange 33 is formed around the lip of the cup-shaped member 28. A sheathed wire electric heating element 34 is urged into good thermal contact with the base 30 by fixing straps 35, and a reflector 36 is disposed beneath the heating element 34 and arranged to reflect radiation from the heating element 34 onto the base 30. A cylindrical outer casing 37 is screwed to lugs 38 projecting from the outer rim of the flange 33, this casing 37 being closed by a bottom closure 39. Two part-cylindrical shielding plates 40 are bolted at opposite sides of the apparatus and spaced from the casing 37 by insulating spacers 41, these plates 40 projecting above the level of the flange 33 to reduce the chance of an operator touching the cup-shaped member 28. One of the shielding plates 40 is continued at 42 to form mounting brackets for attaching the apparatus to a bulkhead or the like. Not seen in the view shown in Figure 3 is a terminal box similar to that shown in Figures 1 and 2 but supported from the casing 37 by a single arm and by one of the mounting brackets. A thermostat 43 is mounted within the casing 37 and arranged to protect the heating element 34 from overheating.

One important distinction between the two constructions is the provision in the second construction of an outwardly depending flange 33 which is heated through the rest of the cup-shaped member 28 in operation of the apparatus. This flange 33 enables a flat shallow utensil such as a frying pan to be heated on the apparatus.

The first construction of heating apparatus is formed with a large axial aperture or hole at the base of the annular member 1 and the second construction with a considerably smaller axial hole 29 in the base of the cup-shaped member 28. These holes reduce the weight of the heating apparatus, an important advantage in aircraft equipment, and enable liquid spilt within the annular or cup-shaped member to drain away from this member. It will be appreciated that the hole need not be on the axis of the cup-shaped member 28 and that a number of holes could be formed in the member.

I claim:

1. An electric heating apparatus comprising a cup-shaped member including side walls and a base formed of material of good heat conductivity, the member being adapted to receive and support a portable liquid container and the base of the member having one or more holes extending therethrough, an outwardly extending lip formed at the upper rim of said member, an electric heating element associated with the member and arranged to heat, by thermal conduction through the member, a liquid container received and supported by the member, a protective casing disposed laterally around and being laterally spaced from the member, means detachably securing the upper end of said casing to said lip, the casing and lip cooperating to shield the heating element from liquid falling on the apparatus, a terminal box disposed at one side of the casing and connected thereto, and supporting means for said terminal box constituted by at least one hollow arm of insulating material through which the electric conductors pass to the heating element.

2. An electric heating apparatus as claimed in claim 1 wherein a thermostat is mounted within the casing and arranged to protect the heating element from overheating.

3. An electric heating apparatus as claimed in claim 1, wherein the cup-shaped member is annular.

4. An electric heating apparatus as claimed in claim 1, wherein the electric heating element is disposed around the side wall of the cup-shaped member.

5. An electric heating apparatus as claimed in claim 1, wherein the electric heating element is disposed around the side wall of the cup-shaped member, said electric heating element consisting of an electric resistance wire wound on a flexible insulating support wrapped around the side wall of the cup-shaped member.

6. An electric heating apparatus as claimed in claim 1, wherein the electric heating element is disposed under and adjacent the base of the cup-shaped member.

7. An electric heating apparatus as claimed in claim 1, wherein a sheathed wire electric heating element is disposed around the side wall of the cup-shaped member.

8. An electric heating apparatus as claimed in claim 1, wherein a sheathed wire electric heating element is disposed under and adjacent the base of the cup-shaped member.

9. An electric heating apparatus as claimed in claim 1, wherein the cup-shaped member is formed with an outwardly extending flange around its lip, the flange being adapted to support a cooking utensil so that heat may be conducted through the cup-shaped member from the heating element to the cooking utensil.

References Cited in the file of this patent

UNITED STATES PATENTS

| 919,843 | Fish | Apr. 27, 1909 |
| 1,438,253 | Moffat | Dec. 12, 1922 |
| 1,705,812 | Fisher | Mar. 19, 1929 |
| 2,180,602 | Morgan | Nov. 21, 1939 |
| 2,700,723 | Lynch | Jan. 25, 1955 |

FOREIGN PATENTS

| 47,601 | Norway | Mar. 3, 1930 |
| 571,568 | France | Feb. 4, 1924 |
| 966,877 | France | Mar. 15, 1950 |

UNITED STATES PATENT OFFICE

CERTIFICATE OF CORRECTION

Patent No. 2,840,683 June 24, 1958

William Hubert Maxwell Butcher

It is hereby certified that error appears in the above numbered patent requiring correction and that the said Letters Patent should read as corrected below.

In the heading to the printed specification, between lines 6 and 7, insert -- Claims priority, application Great Britain September 1, 1954 --.

Signed and sealed this 23rd day of June 1959.

(SEAL)
Attest:
KARL H. AXLINE
Attesting Officer

ROBERT C. WATSON
Commissioner of Patents